Feb. 20, 1945.  R. H. PHINNEY ET AL  2,369,794
APPARATUS FOR SORTING ARTICLES
Filed June 11, 1941  9 Sheets-Sheet 2
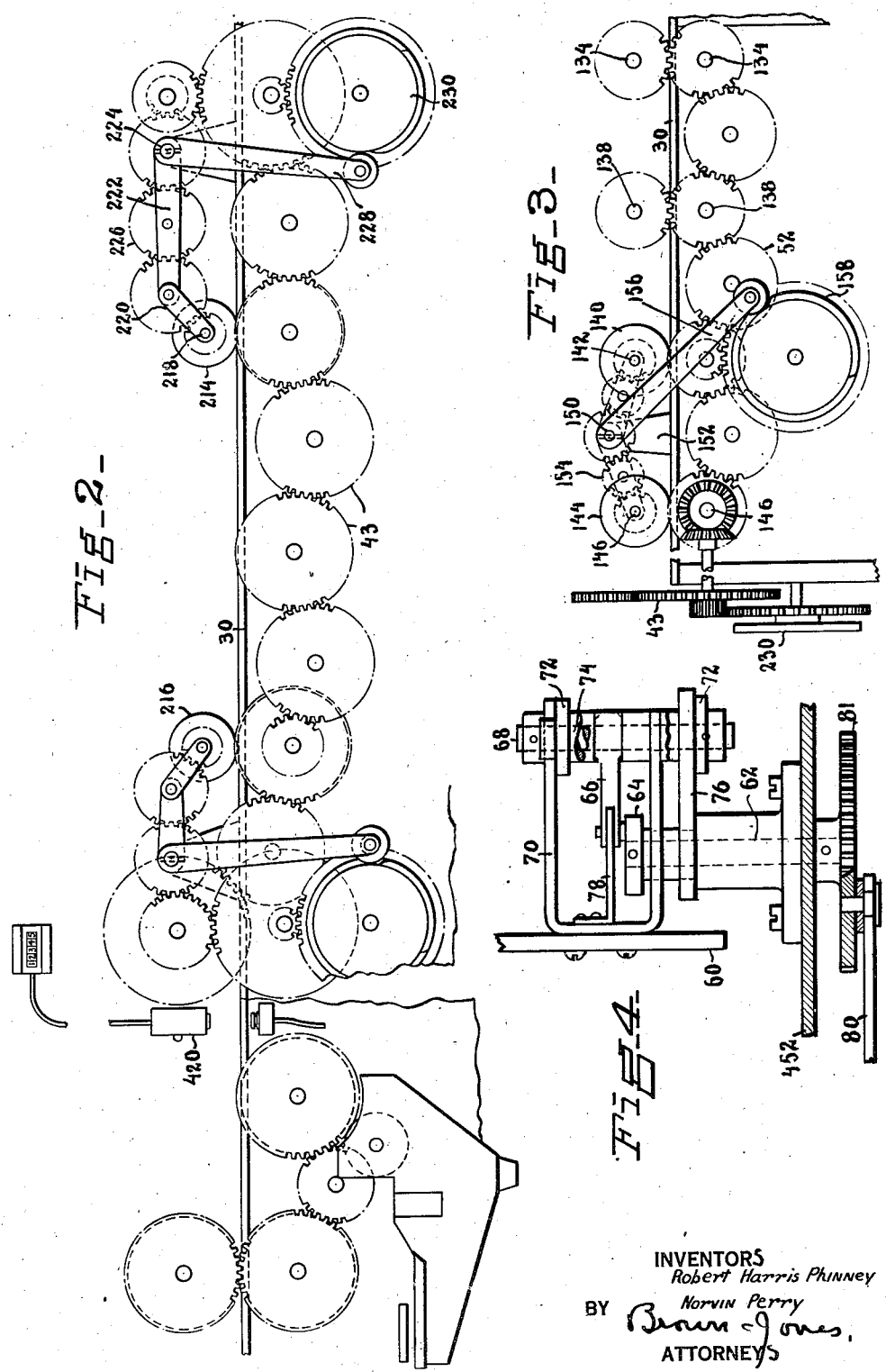
INVENTORS
Robert Harris Phinney
Norvin Perry
BY
ATTORNEYS

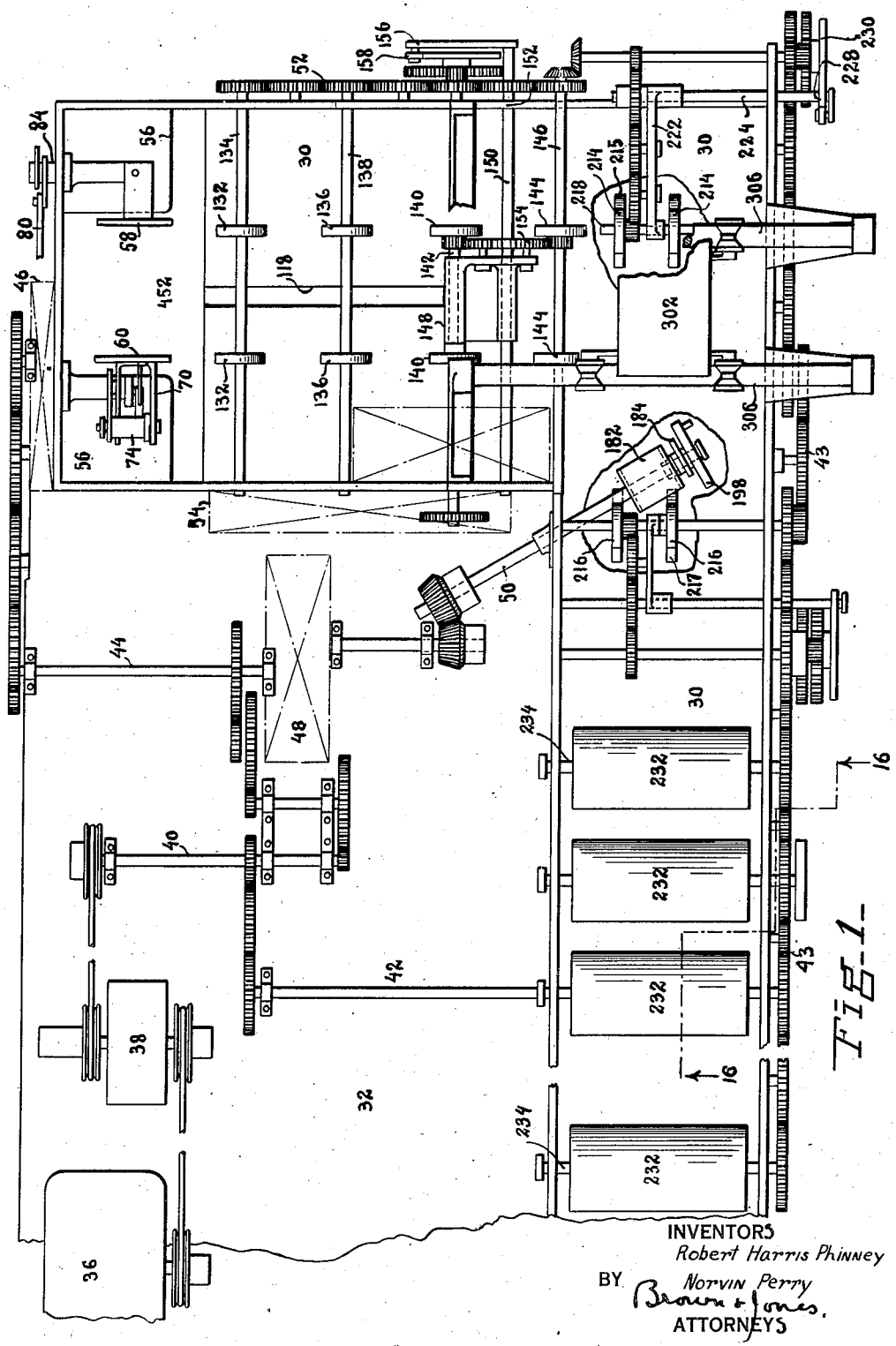

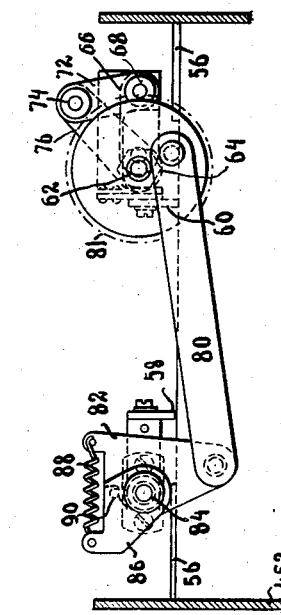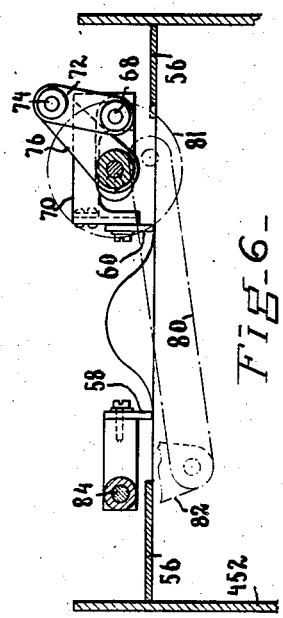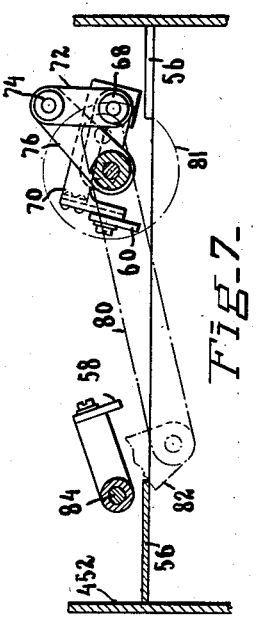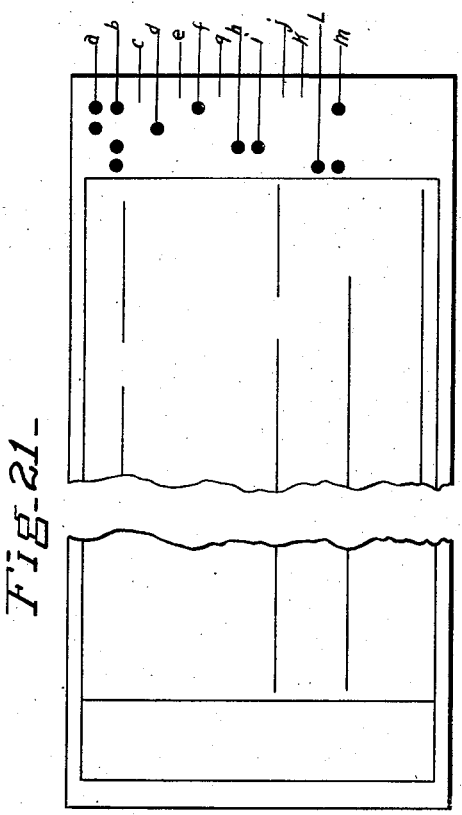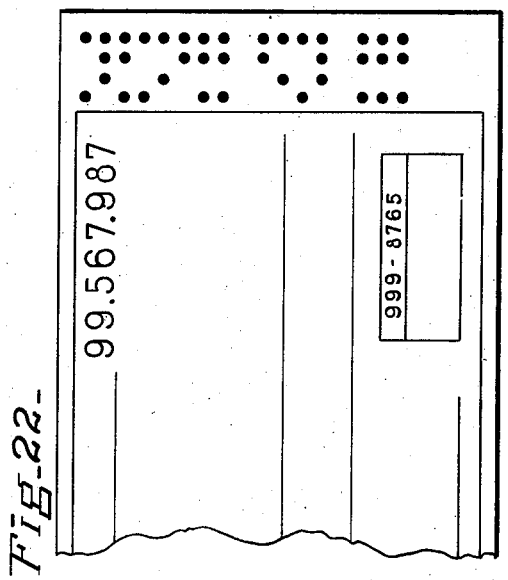

Feb. 20, 1945.  R. H. PHINNEY ET AL  2,369,794
APPARATUS FOR SORTING ARTICLES
Filed June 11, 1941  9 Sheets-Sheet 4
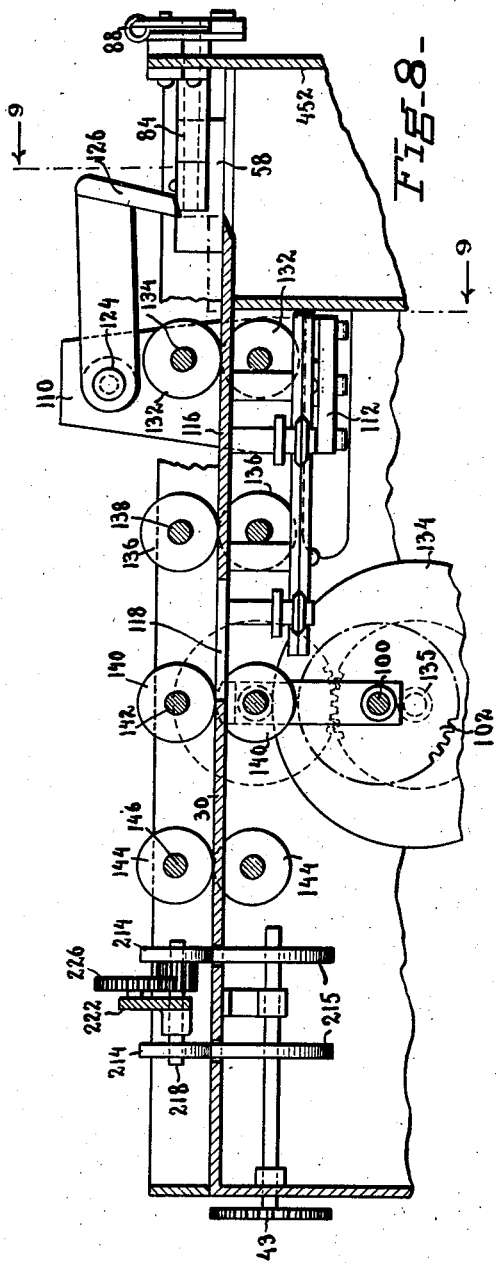
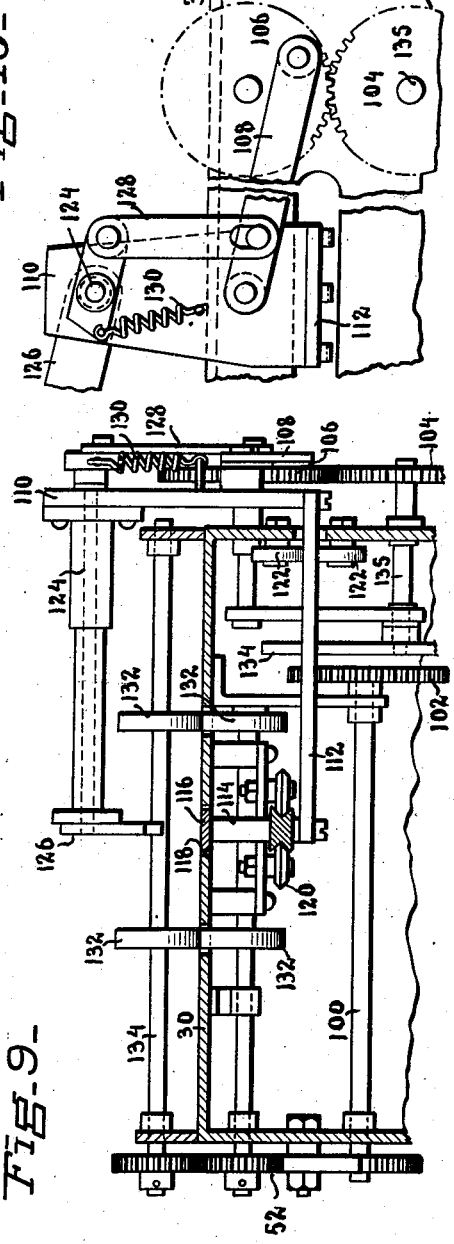
INVENTORS
Robert Harris Phinney
Norvin Perry
BY
ATTORNEYS

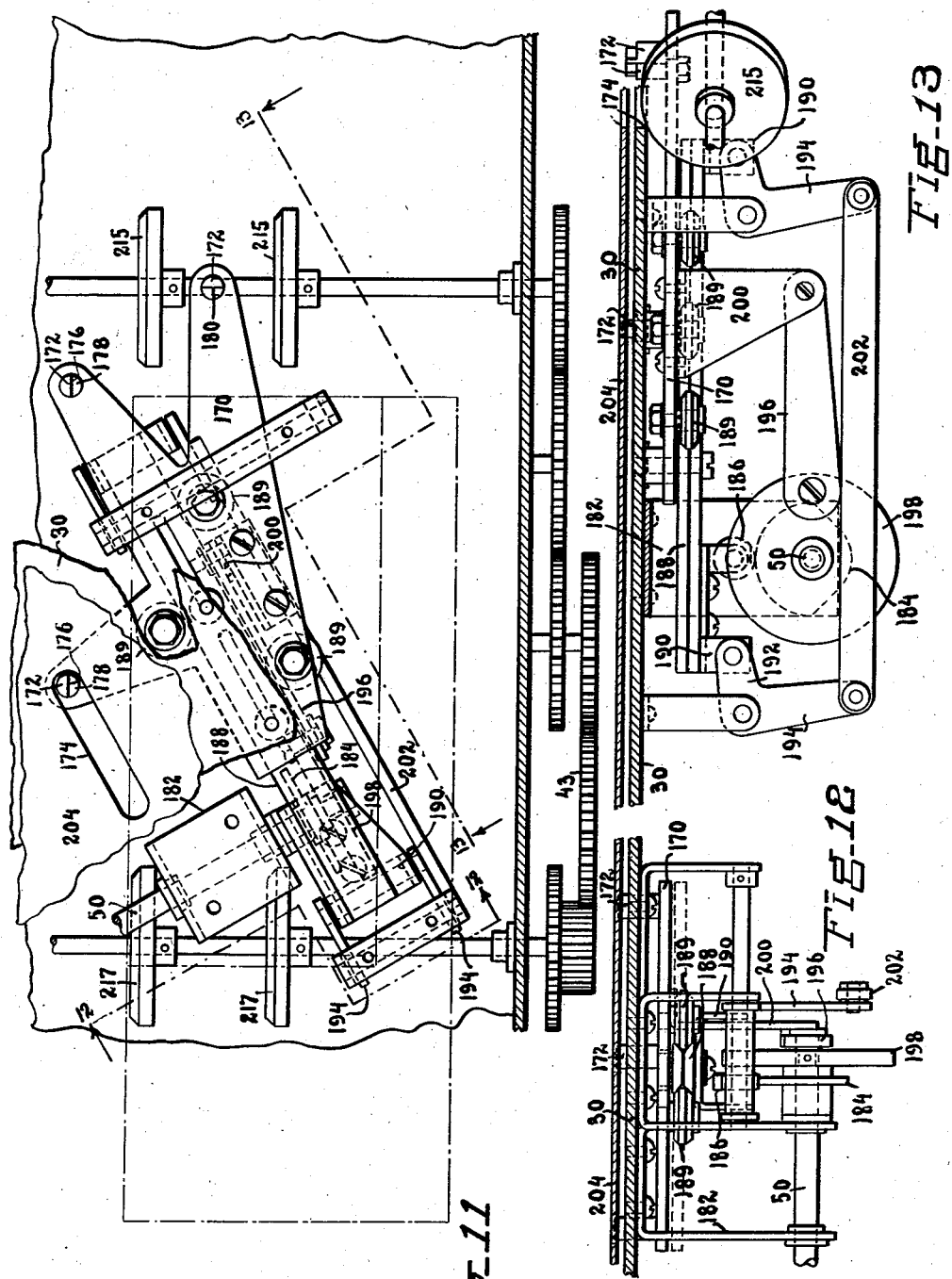

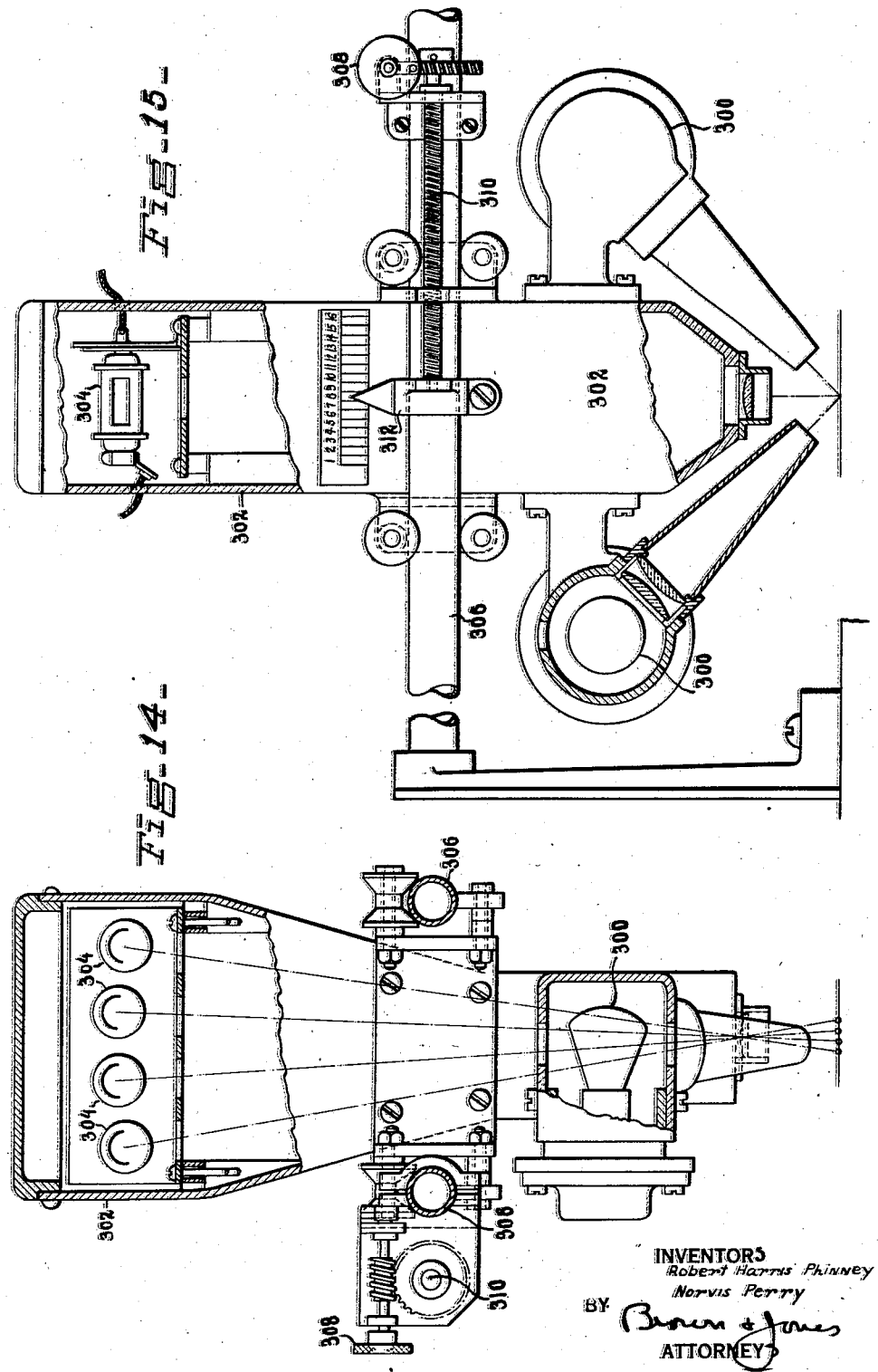

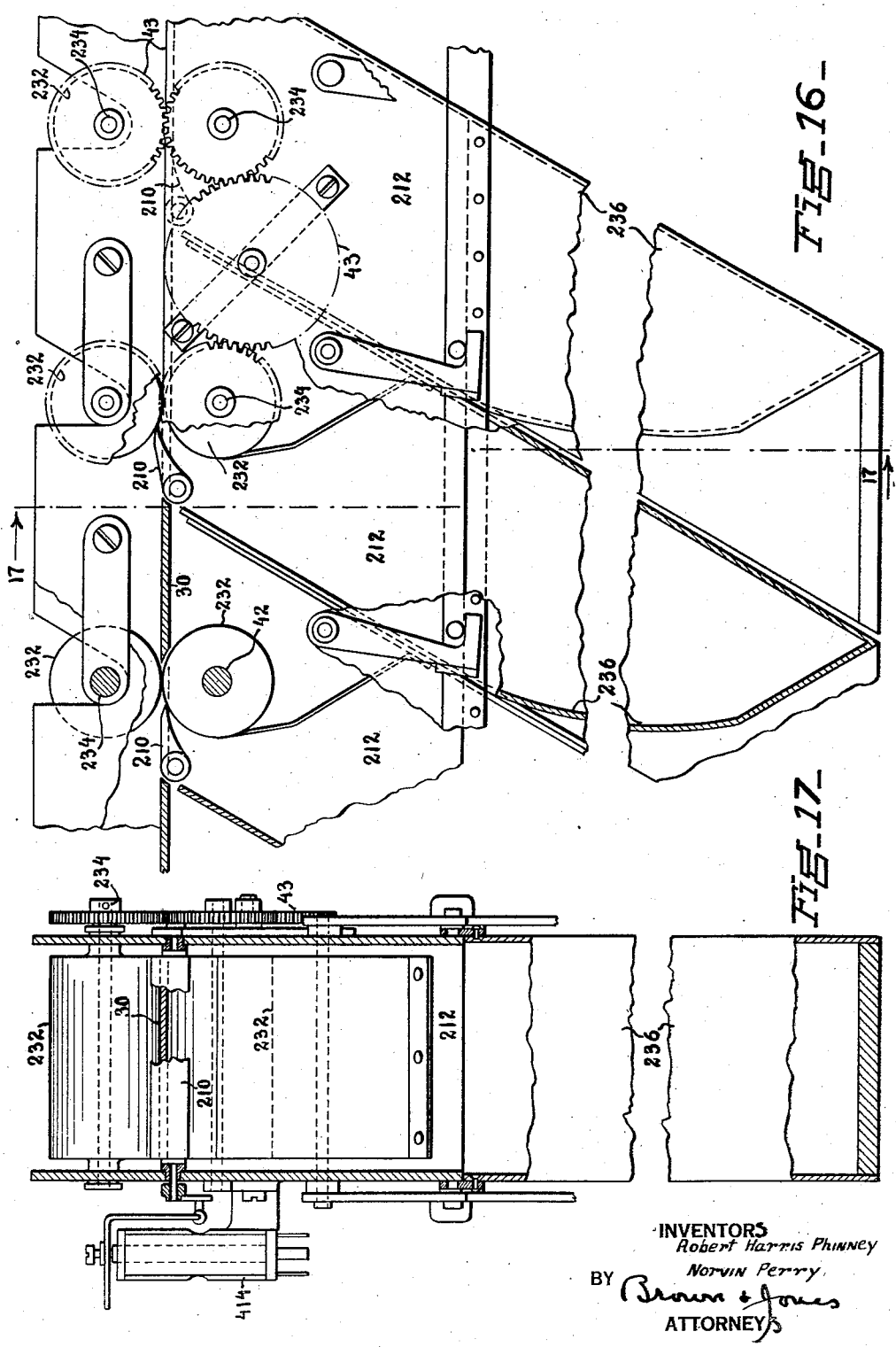

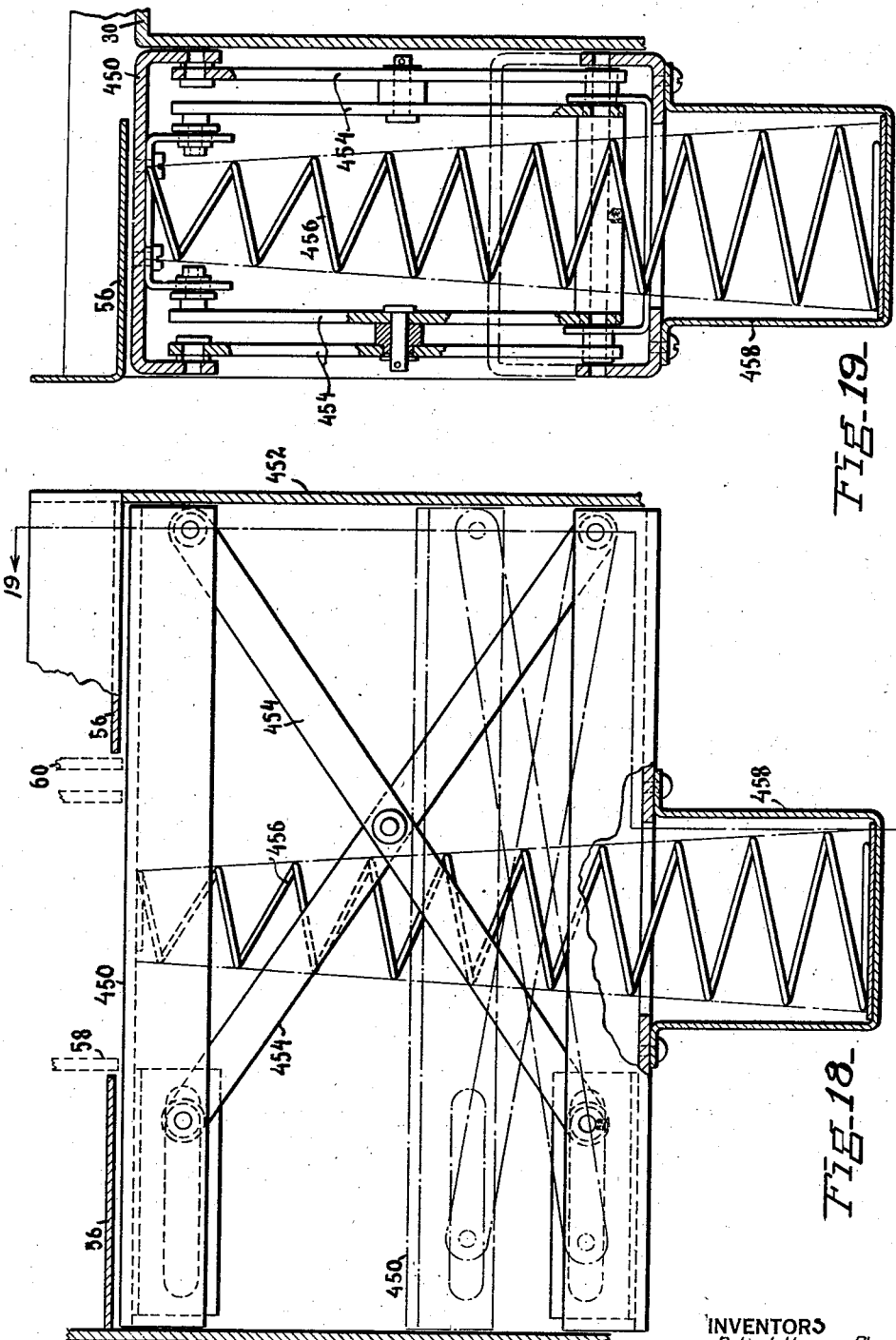

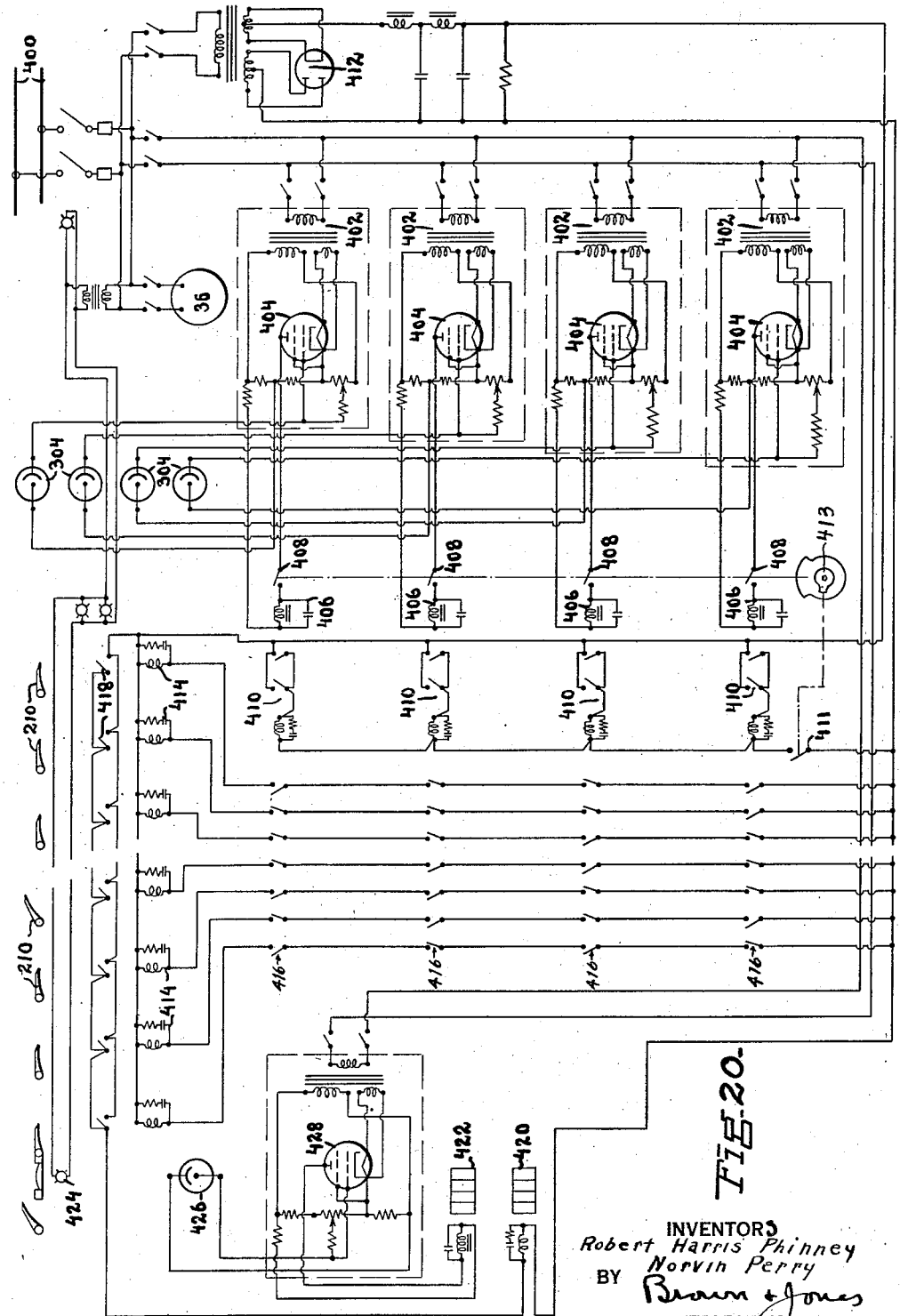

Patented Feb. 20, 1945

2,369,794

UNITED STATES PATENT OFFICE 2,369,794

APPARATUS FOR SORTING ARTICLES

Robert Harris Phinney, New York, N. Y., and Norvin Perry, Stamford, Conn.; said Perry assignor to said Phinney Application June 11, 1941, Serial No. 397,598

6 Claims. (Cl. 209—111)

This invention relates to a machine for sorting articles and more specifically to a machine for sorting differently marked but otherwise similar articles.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Another object of the invention is to provide a machine which successively separates single articles from a pile of such articles and presents them to a photoelectric apparatus.

An object of the invention is to provide a machine which aligns variously sized articles, having predeterminedly positioned indicia thereon, so that predetermined points of said indicia on successive articles are in registry with certain reference points and so that they may be mechanically sorted into groups in accordance with the marking and independently of their size and independently of their general shape.

An object of the invention is to provide apparatus for automatically sorting checks or similar appearing articles into groups having to do with some related factor such as the banks on which the checks are drawn.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 is a plan view of the sorting table of a machine embodying one form of the invention;

Fig. 2 is a front view in elevation of the machine shown in Fig. 1;

Fig. 3 is a view in elevation of the front portion of the right-hand end of the machine shown in Fig. 1;

Fig. 4 is an enlarged plan view of one of the article-bending mechanisms shown in Fig. 1, positioned over the magazine;

Figs. 5–7 show the bending mechanisms, partly shown in Fig. 4, in successive positions in elevation;

Fig. 8 is a view in elevation and partly in section of the means not shown in Fig. 1 for removing the top separated article from the remainder of the articles in the magazine, together with certain parts of the machine shown in Fig. 1, as seen from the right side in Fig. 1;

Fig. 9 is a vertical cross-section, taken along the line 9—9 of Fig. 8;

Fig. 10 is a view in elevation of a detail of the mechanism shown in Fig. 8, as seen from the opposite side;

Fig. 11 is a plan view of the article-orienting mechanism which is principally positioned below the table of the machine and shown in part in the lower right-hand corner of Fig. 1;

Figs. 12 and 13 are views in elevation, partially in section, of the mechanism shown in Fig. 11 and taken along the lines 12—12 and 13—13 respectively;

Figs. 14 and 15 are views in elevation, partly in section, of a scanning unit which may be employed as a part of the machine shown in Fig. 1 and positioned above the plane of the table of that machine and in the lower right-hand corner thereof as shown in Fig. 1;

Fig. 16 is an enlarged view in elevation of a portion of the gates and receptacles of the machines shown in and taken along the line 16—16 of Fig. 1;

Fig. 17 is a view in elevation partly in section of the mechanism in and taken along the lines 17—17 of Fig. 16;

Fig. 18 is a sectional view of the magazine shown at the rear of Fig. 1;

Fig. 19 is a view in section, taken along the line 19—19 of Fig. 18;

Fig. 20 is a diagrammatic representation of an electrical system of connections for use with the machine shown in Fig. 1; and Figs. 21 and 22 are portions of checks adapted to be used in connection with the invention.

Many articles are sorted by hand at a considerable expenditure of labor. The sorting requires a certain mental effort to differentiate between the intelligence-conveying indicia on the successive articles. Thus employees are hired by large banks for the sole purpose of sorting checks. Banks must forward deposited checks to the several Federal reserve districts of the paying banks. Clearing houses must separate checks and send them to their member banks. In the course of these events certain checks are missent with attendant delays.

The present invention contemplates a machine which automatically accomplishes separations of the above-mentioned type. It works at high speed and is not subject to the drawbacks that are present with hand labor.

The machine described below functions to separate checks or other articles into predetermined groups which are indicated by indicia placed on the checks. It separates, for example, a plurality of checks into separate groups, each group corresponding to some bank upon which one or more of the checks is drawn. During a day's business a bank receives various checks which are deposited and each of which must be forwarded by the close of the business day to some other bank. This requires sorting of the checks. In Fig. 21 there is shown a check with indicia thereon in the shape of small, dark circular areas. The arrangement of those areas is peculiar to a single predetermined bank on which the check was drawn. Under the system of this invention each bank issues its checks to its depositors, and its checks all have the particular arrangement of indicia thereon which indicates it as the paying bank and differentiates it from all other banks. There is no chance that any check from any particular bank can possibly be different from any other check of that particular bank because the indicia on each such check are printed or otherwise applied to the check from a single plate or die which plate or die is used in preparing every other check of that bank. This plate or die may or may not be a part of the plate or die which prints the entire check.

The little circular areas, which may be called dots, are at one end of the check, although any general area may be selected. Preferably, the dots are arranged in rows parallel to the length of the check, although this arrangement, too, may be modified. In the example shown there are positions for four dots in each row, and there are positions for seventeen rows. Not each row shows a dot in the example chosen, nor is it necessary to. The positions of the dots along the rows are aligned so that, for example, all dots in the first position in the various rows determine a line perpendicular to the top and bottom edge of the check, etc.

Each row corresponds to a numeral. That numeral may be from 0 to 9, depending upon the positions of the dots. In the example shown in Fig. 21, the first two rows, marked respectively $a$ and $b$ on the drawings, may be considered as indicating the number of the state in which the paying bank is located. The forty-eight states and District of Columbia have been assigned numbers from 50 up to 99 by banking authorities. Higher numbers may be assigned to territories, foreign states, etc. Rows 3 and 4, marked $c$ and $d$ on the drawings, from the top of the check are assigned to the Federal reserve banks or districts of which there are now 12. Dots in row 4 correspond to districts 1 to 9. Dots in rows 3 and 4 correspond to districts 10 to 12. Row 5, marked $e$ on the drawings, provides for the designating of a particular branch of any one of the twelve Federal reserve banks because some of the Federal reserve banks have branches. This now will take care of as many as nine branch banks. When the paying bank is under the immediate jurisdiction of the head office of its Federal reserve bank there is no dot in this row. Banking authorities have given the numbers from one to forty-nine to the forty-nine principal cities in the country respectively. Rows 6 and 7, marked $f$ and $g$ on the drawings, are devoted to indicating the number of the principal city in which the paying bank is located. Each bank having been given its own number in its state or its principal city, such bank number is designated by the dots in rows 8, 9, 10 and 11, marked $h$, $i$, $j$, $k$ on the drawings, or as many of such rows as are necessary. Since there are four rows assigned to this purpose, the number may be as high as 9,999. Rows 12 and 13 are provided to indicate the sub-branches of any particular bank, if desired so to do, as in the case of the example shown below. Other rows may be assigned to indicate other subject matter. In this way, under this invention, every check drawn on any one bank has the same set of indicia as every other check drawn on that bank, and different from the indicia on any check drawn on any other bank. The indicia on the check show and correspond to: (1) the state in which the bank is located, (2) the Federal reserve bank district in which it is, (3) the head office or branch office of that district, under the jurisdiction of which head or branch the bank may come, (4) the principal city in which the bank is located, (5) its own bank number in its state or in the principal city in which the bank is to be found, and (6) its own branch number, if it is a branch of a large bank.

The areas in each row occupied by the dots or other marks have fixed relative positions. The rows have a fixed relative position to each other and one of the areas of rows has a fixed position relative to some cognizable portion of the check. That one particular area or row is fixed in that all checks using the machine have an area or row similarly placed. Exempli gratia, the top row may be at predetermined distance from and parallel to the top edge of the check and the position of the last indicium to the right in the top row may be at a predetermined distance from the right-hand edge of the check and the row may be perpendicular to the latter edge. If the right-hand top corners and top edges of checks so marked are all similarly oriented with respect to a scanner, the latter is properly motivated in accordance with the indicia independently of the shape of the remainder of the check. A difference in shape refers herein not only to a difference in design of contour but also to a difference in size as between two similar contours.

There are various ways in which deposited checks may be sorted so that they may be returned to the respective banks on which they are drawn. (1) They may be sorted by the bank of deposit and sent directly by it to the Federal reserve bank or branch of which the paying bank is a member, or (2) they may be sent by the bank of deposit to its Federal reserve bank or branch and the latter may do the sorting sending the checks to the paying bank or its Federal reserve bank or branch. Furthermore, whatever office sorts the checks, there are various successions of sorting into sets which may be followed—depending upon the convenience and practice of the sorting bank. For example, the sorting bank may (1) sort the checks into states (i. e., states in which the paying banks are located) and then send the 48 groups to the proper Federal reserve bank or branch or may (2) merely sort them into groups of the twelve Federal reserve districts and then, if desired, resort each group to go to the proper head office or branch bank in its Federal reserve district or may (3) sort them into groups of the 49 principal cities and then sort the remainder in states of Federal district and finally into groups of head offices and branches if desired.

Under the system heretofore used, reference had to be made constantly, in sorting checks, to reference lists to find out in which Federal reserve district any one of thousands of paying banks was located. By this invention all such reference to lists, hand sorting, etc., is eliminated because all the necessary information is right on the check as shown by the indicia thereon.

Suppose that the check shown in Fig. 21 is deposited in a Massachusetts bank, and is a check drawn on Branch No. 74 of the "X" bank in New York city. The "X" bank has some number assigned to it by banking authorities, for example 33. The bank in Massachusetts forwards, say, the check to its Federal reserve bank which is in Boston. The latter assembles this check with others similarly received and may use the machine described below to separate them into groups corresponding to the other eleven Federal reserve districts. The position of the dot in row 4 $d$ in the drawings assures that this check falls into group comprising the second district checks.

The Federal reserve bank of Boston then sorts again the checks for the second Federal reserve district into two groups, one of which goes to the head office in New York city and the other of which goes to the branch office (Buffalo). The check in Fig. 21 has no dot in the fifth row $e$ in the drawings and hence that check is sorted by the machine into the group of checks going to the head office. That check is then sent to the head office of the Federal reserve bank of New York along with the other checks in this group.

Upon receipt, the Federal reserve bank of New York (head office) takes those checks which are for banks in its areas and sorts them by scanning first row 9 row $i$ in the drawings and then row 8 row $h$ in the drawings with the result that the check of Fig. 21 is separated into a group consisting only of those drawn on the "X" bank, which has the number 33. All of the latter checks are then sent by the Federal reserve bank of New York to the "X" bank. The "X" bank puts all of the checks so received through a similar machine. In this run the dots in rows 12 and 13, rows $l$ and $m$, respectively, on the drawings, from the top of the check cause the latter to be separated out with all other checks having those same dots which correspond to the 74th branch of the "X" bank. The "X" bank then sends such check to that branch (No. 74) and in this way the check finds its way to the branch bank on which it is drawn and payable.

The spaces beyond rows 12 and 13 in Fig. 21 are available for further sortings, for example, the 74th branch may have certain depositors which issue large numbers of checks and it may be found practicable to use these spaces for sorting those checks for other purposes (dividend checks, etc.) in the same way that the above-mentioned sortings have been carried out.

Suppose, however, that the Federal reserve bank of Boston had decided to sort the check first into states so that it might be guided in that fashion in starting them on their journeys to the respective paying banks. The check shown in Fig. 21 is drawn on a bank in New York city. The state of New York has the number fifty. Hence, the dots in the top row, designated as $a$ in the drawings, correspond to 5 and the dots in the next (second) row, designated $b$ in the drawings, correspond to 0. In this case then, the Boston bank sorts the checks it receives by putting them all through the machine while scanning the top row of dots. This separates the checks into groups, one of the groups including all checks between 50 and 59, another group all between 60 and 69 and a third all between 70 and 79, etc. Each group is then put through the machine separately, and this time the second row of dots is scanned and each group is divided into ten subgroups. In this way all of the checks having a given state number are assembled together separate from the other checks. Thereafter, the Federal reserve bank of Boston may make such further sortings in sub-groups as is in accordance with the accepted practices.

The check shown in Fig. 22 illustrates a Government check. The first eight rows of dots from the top represent the eight-digit serial number of the check. The next row is available for higher numbers. The tenth, eleventh, twelfth and thirteenth rows correspond to the four digits in the four-digit number shown on the check. This number is the number given to the man who counter-signs the check. Rows 15, 16 and 17 correspond with the three-digit number shown on the check, which number is assigned to the particular agency of the Government issuing the check. In sorting a large number of Government checks the machine would operate first on the three-digit number, in order to separate into their respective groups the checks drawn by the respective Government agencies. Then the machine would sort the checks in accordance with the four-digit number, so as to separate those checks into groups, each group corresponding to one counter-signing official and finally the machine would sort the checks into groups within the eight-digit number. In this last sorting, as in others, the checks would be run through first, for example, to separate them into the groups having say, numbers between 10 and 20 million; between 20 and 30 million; between 30 and 40 million, etc. Then each of these groups would be similarly broken down, time after time, until all of the checks could be arranged in order.

The machine in general

The machine shown in the drawings comprises and is built about an L-shaped table 30. Along the upper surface, the checks in the illustrated embodiment, are caused to progress from a magazine at the rear end of the rearwardly-extending portion of the table, onto that rear portion and along the same until they reach the front section of the table where they coact with a photoelectric means above the table to prepare the openings in the table through which the checks are finally propelled to be received into predetermined pockets in accordance with the particular markings on the particular checks. An extension 32 of table 30 may be used to support various shafts, gears, etc.

Just before a check is scanned by the photoelectric means, the check is oriented so that the certain predetermined areas on the successive checks which are at predetermined distances from the edges of the upper right-hand corners of the checks shall occupy the same predetermined positions relative to a predetermined point on the surface of the table and hence with the photoelectric means thereabove. It is obvious that certain checks are not as large as others and that in passing along the table before the scanning operation certain of the checks might assume positions different from the positions of others of the checks. The four positions of the dots in each row on the checks are selected with reference to the upper right-hand corner of the checks and are the same for all checks, independently of the size of the individual checks. This check-aligning mechanism assures that each of the four dot-positions in each row on each check shall be exactly the same with respect to the frame of the machine for each check as it starts to be scanned.

In Fig. 1, 36 denotes a motor the energy from which is delivered through a speed-control box 38 to a shaft 40. The shaft 42 is motivated through shaft 40 through suitable gears and operates the gearing 43 at the front of the device, which runs the several rollers which cause the movement of the checks before and while they are being scanned and projected into the several pockets.

Another shaft 44 is also driven through suitable gearing by shaft 40, and through further gears transmits power to speed-control box 46. The devices (shown in detail in Figs. 4–7) for separating the top check in the magazine 34 from the other checks therein are operated by power from speed-control box 46. Shaft 44 delivers power to another speed-control box 48, from which power is delivered to shaft 50. The latter delivers the energy to the check-aligning mechanism shown in Figs. 11–13.

Gearing 52 at the right end of the device receives its power from gearing 43 and operates the rollers described below, which cause the checks to approach the scanning positions. Gearing 52 also supplies power to the speed-control box 54, which operates the check-extractor mechanism shown in Figs. 8–10.

Check extractor

At the top of the magazine 34 are positioned a pair of stops 56 as in Fig. 1 having their undersurfaces at substantially the height of the table 30. The checks are moved upward in a pile as described hereinafter, until the top checks are arrested by the stops. Means are provided for removing the top check from the magazine and placing it flat upon table 30. These comprise a pair of pressure plates 58 and 60 which have flat surfaces seated on the upper face of the top check. They are pressed down against the top check, and in that position one is moved toward the other horizontally, so that the top check is forced to assume a bent or humped position. Gripping means, described below, grip the hump of the check. Pressure plates 58 and 60 are lifted away from the check, releasing the latter. Then the gripping means pull the check off from the magazine and onto table 30.

The parts next described and as especially shown in Fig. 4 comprise the check-bending mechanism. A horizontal shaft 62, operated through gears from speed box 46, has a disk 64 on its end which acts as a crank for connecting rod 66. The other end of rod 66 has an axle 68 therethrough parallel to shaft 62. A frame 70 is positioned over shaft 62 and has two depending lugs at an end serving as support for the axle 68. At the other end is secured pressure plate 60. Axle 68 is hung in two links 72 which depend rotatably from shaft 74. The latter is parallel to and positioned higher than shaft 62 and is carried by a link 76, the other end of which is rotatable on and about shaft 62. An arm 78 fixed to frame 70 rides on rod 66. This check-humping mechanism operates as follows: The rotation of shaft 62 causes the far end of rod 66 to reciprocate horizontally perpendicular to shaft 62 and to give a like movement to axle 68. Since the latter is suspended by rotatable links 72, the motion is actually a flat arc about the axis of shaft 74 on which links 72 rotate. The horizontal motion of axle 68 causes shaft 74 to move in a flat arc about shaft 62. This arc having a small vertical component raises axle 68 slightly whereby the lugs on frame 70 which are on axle 68 are lifted slightly. This increases the weight with which plate 60 presses against the check. The horizontal motion of axle 68 is communicated to frame 70, plate 60 and hence to the check on which those plates press. Later, after the gripping means have gripped the humped check, disk 64 raises arm 78, frame 70 and plate 60 so that the check is free to be removed by the gripping means.

The other pressure plate 58 pushes down on the check while plate 60 is bending it as in Fig. 1. Pitman link 80 is connected to the toothed disk 81 on shaft 62 and to the irregularly shaped element 82 which is rotatable on a shaft 84 as in Figs. 5, 6 and 7. Element 86 is keyed to shaft 84 as is plate 58. Spring 88 connects elements 82 and 86. A knob 90 on element 86 seats against the periphery of element 82 at certain times. The action of these elements is as follows: When element 82 is rotated clockwise, as seen in Fig. 5, spring 88 stretches, pulling element 86, shaft 84 and plate 58 and causing them to rotate clockwise until stopped by plate 58 pressing against the check. Then link 80 rotates element 82 counter-clockwise, bringing the periphery of the latter against knob 90, moving it and element 86 together with shaft 84 and plate 58 counter-clockwise. This raises plate 58 away from the check, leaving the check free to be removed.

The following parts comprise a mechanism for removing a bent check from the magazine. For clarity they are not shown in Fig. 1. Power is transferred from gearing 52 through shaft 100, gear 102, certain gearing not shown, and gear 104 to gear 106 (see Figs. 8 and 9). The latter is connected by a crank 108 to an upright, horizontally-movable support 110 at the side of table 30. The support has a floor piece 112 extending under table 30 to the mid-point of the latter. A post 114 extends vertically from the floor 112 and carries gripping element 116 which lies level with the top of table 30 and in a slot 118 therein. The slot opens onto magazine 34. Post 114 carries, below the level of the table, a horizontal element with grooved edges into which fit rollers 120 which are supported beneath the table. The motion of crank 108 gives a unitary, horizontal reciprocation to the parts 110—116 which are supported by rollers 120 as well as roller 122 beneath piece 112.

Support 110 carries a shaft 124 which extends over the table to the mid-point thereof and to which at said mid-point is attached a gripping element 126. Linkage 128, controlled by spring 130, connects crank 108 and shaft 124 to give the latter an intermittent oscillation.

The parts are so geared and arranged that as support 110 approaches the magazine 34, gripping element 116 slides over the edge thereof and under a bent check and gripping element 126 at the same time is rotated by the motion of shaft 124 to grip the check between elements 116 and 126. Since the rotation of shaft 124 is not constant, the check is continuously gripped while the gripping elements are pulled away from the magazine by support 110. This brings the check onto table 30, and into the grasp of the pairs of rollers 132. The gripping elements thereupon release the check, the element 126 being moved back to a position above the table. The rollers 132 are above and below the table top in pairs, those in each pair contacting each other at the level of the surface of the table 30. They are operated by shafts 134 from gearing 52. A speed-control disk 134 may be rotatable with idler shaft 136 on which gear 104 is fixed.

Removal to aligner

Rollers 132 cause the check to move along the top of table 30 until it is caught between rollers 136 keyed to shafts 138. It is thus passed successively along to and by rollers 140 keyed to shafts 142 and rollers 144 keyed to shafts 146. Shafts 134, 138 and 146 are rotated directly by gearing 52. Rollers 144 deliver the check to the aligning mechanism.

It is desirable that there be positive means for preventing a check from being brought to the aligner and scanner before the previous check has removed from its position below the latter. Such means are shown in Figs. 1 and 3, and comprise the following elements which raise the two rollers 140, which are above table 30, out of contact with the two rollers 140 which are below table 30. Shaft 142, to which are keyed rollers 140, is itself carried in a frame 148 on and oscillatable by a horizontal shaft 150. Shaft 150 is supported in fixed position by a support 152. A gear train 154 transmits motion from shaft 146 to shaft 142. An arm 156 keyed to shaft 150 has its other end positioned to ride on cam 158 which is rotated by gearing 52.

The upper rollers 140 receive motion at all times from gearing 52 via shaft 146 and gearing 154. Part of the time arm 156 is raised by cam 158. It then rotates shaft 150 and the frame 148. In this way the upper rollers 140 carried by frame 148 are raised to a position above table 30 and during such part of the time they do not contact any check and hence during that time no check is pushed forward to be aligned.

Aligning mechanism

Rollers 144 push each check onto the front section of table 30 to a position under the scanning apparatus. The checks are not all the same shape and are not accurately aligned. It is necessary that the successive rows of dots on each check occupy an exact predetermined position with respect to the scanner. The apparatus shown in Figs. 11–13 accomplishes this.

The irregularly shaped plate 170, beneath table 30 at a point where the scanner is above the table, is reciprocable vertically whereby its vertically extending fingers 172 are raised through respective slots 174 in the surface of the table. Plate 170 is also reciprocable in one direction parallel to the table surface, whereby the fingers move along the slots with the finger ends above the table. The latter by their motion bring any check which they contact into proper orientation. After this is brought about the plate sinks and its fingers disappear under the table. They are then not in the path of the oncoming check.

As explained supra, the checks to be sorted are similarly marked. The fingers of the machine shown in the drawings are positioned to align checks the indicia on which are located with respect to the upper right corner of the check. Two of the fingers have a vertical flat surface 176 against which the upper edge of the check may bear and thereby be aligned and a horizontal surface 178 leading to surface 176. A third finger has a vertical flat surface 180 parallel to the direction which the right end edge of the check is to assume and a flat horizontal surface leading thereto.

The following mechanism gives the plate 170 and fingers 172 their linear motion, which is at an angle with the edges of the finally aligned check, and their vertical motion. Power supply shaft 50 is supported by bracket 182. A cam 184 on shaft 50 causes a cam follower 186 to reciprocate vertically. The latter is fixed to a horizontal guide rail 188 which is parallel to slots 174 and the linear motion of the mechanism and which has grooves in its side edges. Rollers 189 affixed to the under side of plate 170 are movable along said grooves and are supported thereby and guided by rail 188. Thus a vertical motion of the cam follower is translated to the fingers 172. This motion is possible because of the fact that the rail 188 is swiveably attached by brackets 190 to arms 192 of bell cranks 194 supported from the table 30. A connecting rod 196 attached to disk 198 on shaft 50 and to an arm 200 from plate 170 causes the reciprocation of the latter horizontally. A cross piece 202 extending in the direction of the horizontal motion and between the other two arms of the bell cranks 194 assures a steady, continuous motion of plate 170. After a check is roughly in position beneath the scanner the fingers 172 rise up through the slots and then move along the slots parallel to the top of table 30. The check is caught by the fingers and moved into the desired alignment; the top edge of the check bearing against two of the fingers and the right edge against one. The surfaces of the fingers against the check cease to push the check when the horizontal finger motion ceases. The fingers then sink below the table, leaving the check exactly in position. After it has been scanned it is moved along to the left and the table top presents no obstruction to the next check coming on to be scanned.

If desired, there may be flat horizontal guide 204 spaced above the table 30, between which and the table the checks may slide while they are being manipulated by the fingers. It tends to prevent buckling of the check during that operation.

Delivery to pockets

Attention being invited to Figs. 16 and 17, it will be noted that means are provided for setting in motion again a check which has been scanned and for moving it along the front part of the table 30 so that it arrives at the first of the ten gates 210. It either enters that gate if it is open, and passes down through an opening in table 30, or is pushed on until it reaches some gate which is open. The gates lead respectively to collecting pockets 212. The said means are rollers which are operated and timed by the suitably selected and arranged gearing 43.

Rollers 214 and 216 (Figs. 1 and 2) are brought down onto the check after it has been scanned and in cooperation with registering rollers beneath table 30 cause the check to move toward the left end of the machine as seen in Fig. 1. Rollers 214 are keyed to shaft 218 which is carried by link 220 rigidly fixed to arm 222 to form a frame. The latter is keyed to horizontal shaft 224. A gear train 226, driven from gearing 43 and carried by the frame, constantly turns rollers 214. One end of lever 228 is keyed to shaft 224. The other end rides on cam 230 driven by gearing 43. The cam causes lever 228 and shaft 224 to rock, lifting and lowering rollers 214 at predetermined times.

A similar mechanism causes rollers 216 simultaneously to be lifted and lowered with respect to the table 30.

Rollers 216 deliver a check to rollers 232 on shafts 234. There is a succession of similar rollers along the path of the check. Beyond each roller is an opening in the table 30 with a gate 210 therein. When any gate is raised, it catches the oncoming check and directs it into a respective pocket 212. In each pocket there is a container 236 which may be removed so that the checks therein may be attended to and another container substituted. Depending upon the markings on the checks, a particular gate is opened by the electric circuits controlled by the scanner as described below. Should there be no markings on a check, no gate is opened and it is delivered by a final fixed gate into a catch-all pocket.

Scanning mechanism

The scanning mechanism (see Figs. 14 and 15) comprises a pair of light sources 300 focused upon the area to be occupied by one of the rows on a check at the time of scanning. They are carried in a frame 302 which also carries a plurality of photoelectric cells 304. There may be as many cells as there are spaces in a "row" on the check and focusing means focus them respectively on the said spaces. The frame 302 is movable along guide rail supports 306 so as to bring the cells into focus on successive rows. A knob 308 fixed to one of the rails may be movable to turn a screw 310, the motion of which latter moves the frame along the rails. An index 312 fixed to a rail may point to a scale on the frame to show on which row the cells are focused.

Electrical connections

As shown in Fig. 20, the four photoelectric cells 304 are respectively supplied with potential from mains 400 through transformers 402. The four amplifying tubes 404 are controlled respectively by the photo cell currents and operate respectively the four relays 406. Their operation must be synchronized with check alignment and scanning since they close the circuits for the selection and operation of the gates leading to the various pockets wherein the checks are to be deposited. Hence, a cam is provided in the gearing of the machine to operate switches 408 in the circuits of relays 406. The cam makes one revolution for every check. The four relays 406 operate respectively the four repeater relays 410 which use direct current supplied by the rectifier 412. The latter also supplies direct current to ten circuits having respective gate-operating means 414. Three of these circuits are not shown in Fig. 20. Each of the repeater relays operates its own set of ten switches 416 which are respectively in the said ten circuits. Certain ones of each ten switches are make and others are break. These are so arranged that for each possible combination of one or more activated repeater relays there is but one of the ten circuits closed. Hence, for each combination of active photo cells, i. e., for each combination of dots, there is but a single gate opened. For example, if the top and bottom relay in Fig 20 act together, only the right hand circuit of the ten circuits is closed and only the right hand gate is opened. The left position of the switches 416 indicates a switch normally open and the right position indicates a switch normally closed.

Whenever any relay 406 is energized it closes one of the contacts in its repeater relay 410. Relay 406, however, is energized only while the check is under the photo cells but the gate must be kept open until the check has reached and passed through it. Hence, the other contact in the repeater relay is automatically closed by the closing of the one contact and stays closed until the repeater relay circuit is physically broken at switch 411 by the cam which operates switches 408.

Each of the gate-operating means 414 is provided with its own make contact 418, in parallel with nine other make contacts 418 in a circuit which is parallel with the repeater relay circuits and which contains a counter 420 to count all the checks which effect the photo cells 304.

There is a counter 422 for odd checks. Such checks pass between light 424 and photo cell 426 thereby shutting off the light from the cell. The latter is supplied with a circuit from the mains 400. The cutting off of the photoelectric current by such check causes the amplifier 428 to activate the counter 422.

The relays 406 may be energized by the illumination of the photo-tubes with amplifier circuits as shown for amplifiers 404, or the relays 406 may be energized by the darkening of the photo-tubes with amplifier circuits as shown for amplifier 428.

The check magazine

In Figs. 18 and 19 there is shown a preferred form of check magazine 34. A horizontal platform 450 is guided within the side walls 452 of the magazine by a roller link mechanism 454, which moves the platform parallel to itself. A spring 456, positioned between the platform and the bottom of a well 458, gives a variable pressure on the platform. When the platform is in extreme top position, the spring exercises no pressure. The spring is chosen to give a reaction at different positions of the platform which is equal to the weight of the checks remaining on the platform at that position. Hence, the top check is always held without upward pressure at the level of the top of the magazine, which level is at the height of the top of table 30.

The operation of the device

A number of checks marked in accordance with this invention are placed in the magazine. The photo cells in the scanner are focused along that line of the table over which a particular row of dots will be in registry while the check is being scanned. The motor is started. This puts in motion the several gear trains which run the machine. The electric connections are made. The top check is bent by the pressure plates 58 and 60. Elements 118 and 126 then grip that check, pull it onto table 30 and retire. Rollers 132 seize it and pass it along to rollers 148 and thence to the scanning position where fingers 172 align it. Then the scanner scans it. While the aligning and scanning has been taking place, rollers 140 have been raised so that they positively fail to push any other check under the scanner until the preceding one has left the scanner. Then they lower again. Next rollers 214 and 216 are lowered on to the check and move it along to the gates one of which has been opened by the scanner and which stays open long enough for the check to reach the gates from the scanning position. Thus the check reaches one of the pockets. The rate of operation of each part is timed so that the checks pass in succession rapidly and orderly from magazine to magazine.

What we claim as new and desire to secure by Letters Patent is:

1. A machine for sorting articles such as checks, and which articles are of different dimensions and provided with identification areas such that their source of origin may be determined, said machine including a deck, intermittently operative elements to grip a flexed check between them, means for reciprocating said elements to bodily shift a gripped check in a lateral direction over said deck, means for thereupon operating said element to release the gripped check, a series of continuously operative rollers receiving a succession of checks from said gripping elements, second rollers receiving said checks from said first-named rollers, means for periodically rendering said second rollers inoperative to feed a check in a lateral direction over said deck, a third set of rollers receiving a check from said second rollers, fingers projectable above the plane of the deck and movable with respect to the same, said fingers being arranged to engage a pair of adjacent check edges to align the same with reference to a predetermined area of the deck of said table, means for thereupon retracting said fingers below the plane of said deck, means reacting to the identification area of the check when so positioned, a fourth set of rollers operative intermittently to thereupon successively engage checks and to move the same along said deck, said deck being formed with a plurality of openings, pivotally mounted gates normally preventing entrance of checks through said openings, said gates being shiftable to positions to obstruct passage of checks along said table deck and diverting the same through said openings, and means controlled by said reacting means for operating said gates.

2. A machine for sorting articles such as checks, and which articles are of different dimensions and provided with identification areas such that their source of origin may be determined, said machine including a deck, intermittently operative elements to grip a flexed check between them, means for reciprocating said elements to bodily shift a gripped check in a lateral direction over said deck, means for thereupon operating said element to release the gripped check, a series of continuously operative rollers receiving a succession of checks from said gripping elements, second rollers receiving said checks from said first-named rollers, means for periodically rendering said second rollers inoperative to feed a check in a lateral direction over said deck, a third set of rollers receiving a check from said second rollers, fingers projectable above the plane of the deck and movable with respect to the same, said fingers being arranged to engage a pair of adjacent check edges to align the same with reference to a predetermined area of the deck of said table, means for thereupon retracting said fingers below the plane of said deck, means reacting to the identification area of the check when so positioned, a fourth set of rollers operative intermittently to thereupon successively engage checks and to move the same along said deck, said deck being formed with a plurality of openings, pivotally mounted gates normally preventing entrance of checks through said openings, said gates being shiftable to positions to obstruct passage of checks along said table deck and diverting the same through said openings, means controlled by said reacting means for operating said gates, and common receiving means for all checks moving along said table deck and not so diverted.

3. A machine for sorting articles such as checks, and which articles are of different dimensions and provided with identification areas such that their source of origin may be determined, said machine including a deck, intermittently operative elements to grip a flexed check between them, means for reciprocating said elements to bodily shift a gripped check in a lateral direction over the deck, means for thereupon operating said element to release the gripped check, a series of continuous operative rollers receiving a succession of checks from said gripping elements, second rollers receiving said checks from said first-named rollers, means for periodically rendering said second rollers inoperative to feed a check in a lateral direction over said deck, a third set of rollers receiving a check from said second rollers, means reacting to the identification area of the check when so positioned, a fourth set of rollers operative intermittently to thereupon successively engage checks and to move the same along said deck, said deck being formed with a plurality of openings, pivotally mounted gates normally preventing entrance of checks through said openings, said gates being shiftable to positions to obstruct passage of checks along said table deck and diverting the same through said openings, and means controlled by said reacting means for operating said gates.

4. A machine for sorting articles such as checks, and which articles are of different dimensions and provided with identification areas such that their source of origin may be determined, said machine including a deck, a series of continuously operative rollers receiving a succession of checks, second rollers receiving said checks from said first-named rollers, means for periodically rendering said second rollers inoperative to feed a check in a lateral direction over said deck, a third set of rollers receiving a check from said second rollers, fingers projectable above the plane of the deck and movable with respect to the same, said fingers being arranged to engage a pair of adjacent check edges to align the same with reference to a predetermined area of the deck of said table, means for thereupon retracting said fingers below the plane of said deck, means reacting to the identification area of the check when so positioned, a fourth set of rollers operative intermittently to thereupon successively engage checks and to move the same along said deck, said deck being formed with a plurality of openings, pivotally mounted gates normally preventing entrance of checks through said openings, said gates being shiftable to positions to obstruct passage of checks along said table deck and diverting the same through said openings, and means controlled by said reacting means for operating said gates.

5. A machine for sorting articles such as checks, and which articles are of different dimensions and provided with identification areas such that their source of origin may be determined, said machine including a deck, a series of check-advancing means to shift successive checks in a lateral direction over said deck and to deposit the same to assume substantially a position of rest upon the deck, fingers projectable above the plane of the deck and movable with respect to the same, said fingers being arranged to engage a pair of adjacent check edges to align the same with reference to a predetermined area of the deck of said table, means for thereupon retracting said fingers below the plane of said deck, means reacting to the identification area of the check when so positioned, a further series of check-advancing means to cause said checks to be shifted along said deck, the latter being formed with a plurality of openings, pivotally mounted gates normally preventing entrance of checks through said openings, said gates being shiftable to positions to obstruct passage of checks along said table deck and diverting the same through said openings, and means controlled by said reacting means for operating said gates.

6. A machine for sorting articles such as checks, and which articles are of different dimensions and provided with identification areas such that their source of origin may be determined, said machine including a deck, a series of check-advancing means to shift successive checks in a lateral direction over said deck and to deposit the same to assume substantially a position of rest upon the deck, fingers projectable above the plane of the deck and movable with respect to the same, said fingers being arranged to engage a pair of adjacent check edges to align the same with reference to a predetermined area of the deck of said table, means for thereupon retracting said fingers below the plane of said deck, means reacting to the identification area of the check when so positioned, a further series of check-advancing means to cause said checks to be shifted along said deck, the latter being formed with a plurality of openings, pivotally mounted gates normally preventing entrance of checks through said openings, said gates being shiftable to positions to obstruct passage of checks along said table deck and diverting the same through said openings, means controlled by said reacting means for operating said gates, and means for causing certain of said check-advancing means to operate continuously while other of said advancing means operate intermittently.

ROBERT HARRIS PHINNEY.
NORVIN PERRY.